United States Patent
Jang et al.

(10) Patent No.: US 8,606,295 B2
(45) Date of Patent: Dec. 10, 2013

(54) LOCALIZATION DEVICE AND LOCALIZATION METHOD

(75) Inventors: Min Su Jang, Daejeon (KR); Jae Hong Kim, Daejeon (KR); Joo Chan Sohn, Daejeon (KR); Hee Sung Chae, Daejeon (KR); Jae Yeon Lee, Daejeon (KR); Do Hyung Kim, Daejeon (KR); Chan Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/333,763

(22) Filed: Dec. 21, 2011

(65) Prior Publication Data

US 2012/0165041 A1 Jun. 28, 2012

(30) Foreign Application Priority Data

Dec. 23, 2010 (KR) .................... 10-2010-0134091

(51) Int. Cl.
*H04W 24/00* (2009.01)
(52) U.S. Cl.
USPC ............. 455/456.1; 455/456.3; 455/456.2; 455/456.5; 455/414.1; 455/63.1; 455/114.2

(58) Field of Classification Search
USPC .......... 455/456.3, 456.1, 414.1, 456.2, 456.5, 455/63.1, 114.2; 701/207, 200
See application file for complete search history.

(56) References Cited

U.S. PATENT DOCUMENTS

| | | | |
|---|---|---|---|
| 2004/0043758 A1* | 3/2004 | Sorvari et al. | 455/414.1 |
| 2008/0077326 A1* | 3/2008 | Funk et al. | 701/220 |
| 2008/0242418 A1* | 10/2008 | Theimer et al. | 463/42 |
| 2010/0125409 A1* | 5/2010 | Prehofer | 701/207 |
| 2011/0190008 A1* | 8/2011 | Eronen et al. | 455/456.3 |

FOREIGN PATENT DOCUMENTS

EP 1790993 A2 5/2007

* cited by examiner

*Primary Examiner* — Khalid Shaheed
(74) *Attorney, Agent, or Firm* — Nelson Mullins Riley & Scarborough LLP

(57) ABSTRACT

Disclosed are a device and a method for localizing a user indoors using a wireless local area network, and more particularly, a localization device and a localization method that improve localization accuracy by fusing various context information when localizing a user-portable/wearable device connected with a wireless network based on an RF-based wireless network such as ZigBee.

13 Claims, 2 Drawing Sheets

LOCALIZATION DEVICE AND LOCALIZATION METHOD

CROSS-REFERENCE TO RELATED APPLICATIONS

This application claims priority to and the benefit of Korean Patent Application No. 10-2010-0134091 filed in the Korean Intellectual Property Office on Dec. 23, 2010, the entire contents of which are incorporated herein by reference.

TECHNICAL FIELD

The present invention relates to a device and a method for localizing a user indoors using a wireless local area network, and more particularly, to a localization device and a localization method that improve localization accuracy by fusing various context information when localizing a user-portable/wearable device connected with a wireless network based on an RF-based wireless network such as ZigBee.

BACKGROUND

An RF-based positioning system is composed of a mobile radio wave receiver and a plurality of radio wave transmitters installed in a space.

In the RF-based positioning system configured as above, the radio wave transmitter transmits a signal to the space periodically and the radio wave receiver receives the signal transmitted by the radio wave transmitter to determine an ID of the radio wave transmitter transmitting the corresponding signal and signal strength. When positional information of the radio wave transmitter is added to the determined results, a position of the radio wave transmitter transmitting the corresponding signal can be calculated by using a triangulation method or the like. For instance, nodes constituting a ZigBee network receive beacon messages periodically to generate a received signal strength indicator (RSSI) list and by applying a calculation method such as a triangulation method based on positional information of nodes transmitting the beacon messages, a relative position of the corresponding terminal node can be calculated from the ZigBee nodes. In this case, if absolute positions of the ZigBee nodes are known, absolute positions of terminal nodes can be also determined.

The RF-based positioning technology has an advantage of easily constructing a system or an environment localizing an object or a person carrying a portable device by using an environment sensor and the simple portable device, but is disadvantageous in that positioning performance is greatly influenced by the surrounding environment. The reason is that the RF radio wave varies greatly in moving direction and strength according to an environmental structure, a physical property of wall, and presence or absence of an obstacle including a person and an object.

In order to overcome the disadvantage, closely disposing a plurality of RF transmitting nodes in a space in a regular pattern such as a grid pattern and constructing an RF Fingerprint for the entire space have been attempted to be used for positioning, but it is difficult to continuously obtain excellent performance due to characteristics of the RF radio wave as described above in the actual environment, and due to installation of a large number of sensors in the environment, commercialization is blocked.

A pyroelectric infrared (PIR) sensor as an on-off sensor outputting a value when movement is sensed in a sensible area is primarily used to sense a moving body and as an example, there is an electric lamp which is automatically turned on and off. The PIR sensor has an advantage of low cost and is advantageous for privacy protection as compared with a camera sensor because when installed in a space, the PIR sensor cannot determine who the sensed movement belongs to and can detect only movement of a person (i.e., the trace of movement), but if several people exist in the space, the PIR sensor cannot distinguish who the sensed movement belongs to.

SUMMARY

The present invention has been made in an effort to provide a localization device and a localization method that can improve localization accuracy by fusing various context information with an RF-based positioning result.

An exemplary embodiment of the present invention provides a localization device receiving a beacon message inputted from a fixed RF node to output the message, receiving the message from a mobile RF node moving with a user, and receiving a recognition result from a recognition device recognizing the user while moving or being fixed, the localization device including: a positioning unit, a context storing unit, and an inference unit, wherein the positioning unit calculates a position of the mobile RF node on the basis of the message inputted from the mobile RF node and positional information of the fixed RF node to output positional information of the mobile RF node, the context storing unit stores the recognition result inputted from the recognition device as context information of a user's position, and the inference unit corrects a distortion of the positional information of the mobile RF node inputted from the positioning unit with reference to the context information stored in the context storing unit.

Another exemplary embodiment of the present invention provides a localization method for localizing a user by receiving a beacon message inputted from a fixed RF node to output the message, receiving the message from a mobile RF node moving with a user, and receiving a recognition result from a recognition device recognizing the user while moving or being fixed, the localization method including: extracting and outputting a signal strength list from the message inputted from the mobile RF node; calculating a position of the mobile RF node on the basis of the signal strength list and positional information of the fixed RF node to output positional information of the mobile RF node; and correcting a distortion of the positional information of the mobile RF node with reference to the context information on a user's position that is a recognition result inputted from the recognition device.

According to exemplary embodiments of the present invention, it is possible to improve accuracy of RF-based localization.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
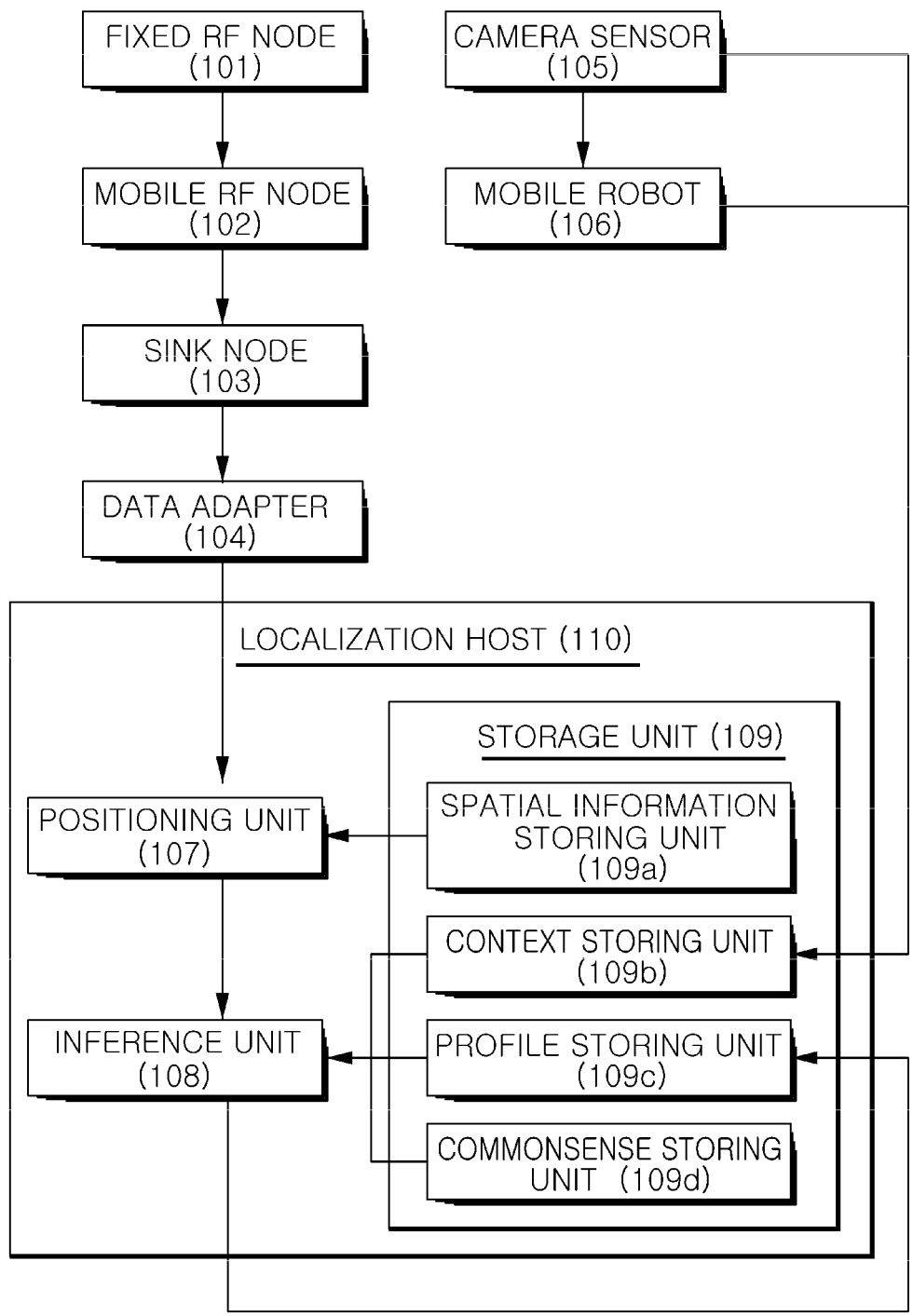
FIG. 1 is a block diagram showing a localization device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a localization device and a localization method according to exemplary embodiments of the present invention are described with reference to the accompanying drawings.

First, a localization device according to an exemplary embodiment of the present invention is described with reference to FIG. 1.

As shown in FIG. 1, a localization device according to the exemplary embodiment of the present invention includes at least one fixed RF node 101 transmitting a beacon message at a desired period; a mobile RF node 102 receiving the beacon message transmitted from the fixed RF node 101 to compile and output a signal strength list and moving with a user; a positioning unit 107 calculating a position of the mobile RF node based on the signal strength list inputted from the mobile RF node and positional information of the fixed RF node and outputting the positional information of the mobile RF node; recognition devices 105 and 106 outputting a recognition result of recognizing the user while moving or being fixed; a context storing unit 109b storing the recognition result inputted from the recognition devices 105 and 106 as context information of a user's position; and an inference unit 108 correcting a distortion of the positional information of the mobile RF node 102 inputted from the positioning unit 107 with reference to the context information stored in the context storing unit.

Components of the localization device according to the exemplary embodiment of the present invention configured as above are described below.

The fixed RF node 101 is plurally fixed in a space where a user is to exist and constitutes a wireless network based on ZigBee or the like and a routing protocol may be based on Tree routing or AODV or modification thereof.

The fixed RF node 101 transmits beacon messages for localization periodically.

The mobile RF node 102 may be directly carried by a user needed to be localized or embedded in a device worn by the user needed to be localized, and receives and outputs the beacon message transmitted from the fixed RF node 101.

The recognition devices 105 and 106 output recognition results of recognizing the user while moving or being fixed and as specific examples, there are a camera sensor 105 and a mobile robot 106. Hereinafter, in describing the present invention, the camera sensor 105 and the mobile robot 106 are exemplified as the recognition devices 105 and 106 described below, but the present invention is not limited thereto and any one of the camera sensor 105 and the mobile robot 106 or other devices may be provided as the recognition devices 105 and 106.

The camera sensor 105 is fixed in the space where the user is to exist and recognizes the user (person or object) within its own sensing range in a possible situation. The recognized result is stored in the context storing unit of a localization host which is described below.

The recognition result recognized by the camera sensor 105 includes information on who the recognized user is, information on a position where the user is recognized (i.e., information on the position where the camera sensor 105 is installed, on an angle at which the camera sensor 105 views the user, or the like) and information on the time when the user is recognized.

While freely moving in a space in accordance with a given role, the mobile robot 106 recognizes a user (person or object) whom the mobile robot 106 runs into in a possible situation or recognizes the user when the user uses the mobile robot 106. As a result, the recognition result is stored in a context storing unit 109b of a localization host 110 which is described below.

The recognition result recognized by the mobile robot 106 includes information on who the recognized user is, information on the position where the user is recognized, and information on the time when the user is recognized.

Even though not shown in the figure in detail, the localization device according to the exemplary embodiment of the present invention can recognize an action or a movement of the user by additionally including an inertial sensor (e.g., acceleration sensor) recognizing the movement of the user while moving with the user and an action recognizer recognizing the movement of the user while moving with the user. In this case, the inertial sensor and the action recognizer may be embedded in a device mounted with the mobile RF node 102 and the user may carry or wear a device mounted with the inertial sensor and the action recognizer.

Movement information of the user recognized by the inertial sensor and action information of the user recognized by the action recognizer are stored the context storing unit 109b of a storage unit 109 provided in the localization host 110 to be described below.

A localization system according to the exemplary embodiment of the present invention includes the localization host 110 for calculating a position of the mobile RF node 102 (user's position having a corresponding mobile RF node) and the localization host 110 is embedded in the device including the mobile RF node 102 or in a remote server system.

In the case where the localization host 110 is embedded in the remote server system, a sink node 103 is provided to serve as a bridge transferring a message outputted from the mobile RF node 102 to the localization host 110 and in the case where the localization host 110 is embedded in the device including the mobile RF node 102, the sink node 103 is not needed.

The message outputted from the mobile RF node 102 is inputted to a data adapter 104 and the data adapter 104 extracts a signal strength list from the inputted message to output the signal strength list to the localization host 110.

The localization host 110 includes the positioning unit 107, the storage unit 109, and the inference unit 108.

The positioning unit 107 of the localization host 110 calculates a relative position (relative position of the user having the corresponding mobile RF node) of the mobile RF node 102 on the basis of the signal strength list inputted from the data adapter 104 and the positional information of the fixed RF node 101 and outputs positional information of the mobile RF node 102 (positional information of the user having the corresponding mobile RF node). Herein, positional information of the fixed RF node 101 is stored in a spatial information storing unit 109a of the storage unit 109 and the detail description about this can be found from the description of the storage unit 109 below.

The result calculated by the positioning unit 107 forms a concentric area having a predetermined diameter but not an exact coordinate value in consideration of an average error of the system.

The storage unit 109 of the localization host 110 includes the spatial information storing unit 109a, the context storing unit 109b, the profile storage unit 109c, and a commonsense storing unit 109d.

The spatial information storage unit 109a stores and keeps the information on installation position of the fixed RF node 101 as spatial information of network installation. In the spatial information, a structure of a space where the fixed RF node 101 is installed and the user is to exist may be represented by a structure such as a grid map or a topology map and includes the information on installation position of the fixed RF node 101 in a space by actual measurement. As an example of the information on installation position of the fixed RF node 101 stored in the spatial information storing unit 109a, there is "RE_node_address=001, x=100, y=45, area=102 Ho".

The context storing unit 109b stores the recognition result inputted from the recognition devices 105 and 106 as context information indicating the user's position with time and thereafter, the stored context information is used when correcting distortion of the positional information of the mobile RF node 102 in the inference unit 108. The positional information of the mobile RF node 102 of which the distortion is corrected through the inference unit 108 is reflected. Undoubtedly, in the case where the inertial sensor and the action recognizer are additionally provided, the context storing unit 109b stores the movement information of the user recognized by the inertial sensor and the action information of the user recognized by the action recognizer as the context information indicating the user's positions with time together with the recognition result inputted from the recognition devices 105 and 106.

For instance, in the case where the localization system according to the present invention includes the mobile robot 106 as an example of the recognition device, if the mobile robot 106 recognized a user A at a hallway in front of 115 Ho at 2:10 p.m., Sep. 30, 2010, the mobile robot 106 transmits these facts to the localization host 110 to store the facts in the context storing unit 109b and thereafter, the information stored in the context storing unit 109b is used when correcting the distortion of the positional information of the mobile RF node 102 in the inference unit.

The profile storing unit 109c stores advance information on the user. For instance, the advance information on the user stored in the profile storing unit 109c includes age, sex, health condition, residence, and the like of the user.

The commonsense storing unit 109d includes commonsense information regarding the user and an environment where the user exists, i.e., generally accepted knowledge information.

An example of the commonsense information stored in the commonsense storing unit 109d is described in the following Table 1.

TABLE 1

| Category | Example |
| --- | --- |
| Commonsense | (1) An elderly person does not stay longer than 30 minutes in a hallway in front of the residence after midnight. |
| Physical kinematic limitation | (2) An elderly person moves at a speed of 5m/s or less.<br>(3) An elderly person with arthritis moves at a speed of 2m/s or less. |
| Usage and limitation of space | (4) One relieves oneself or takes a shower at a bathroom.<br>(5) It takes 30 minutes or less to relieve oneself.<br>(6) It takes 40 minutes or less to take a shower. |

The commonsense information as shown in Table 1 may be directly coded in a program and implemented by a logical system such as rules of an expert system.

The inference unit 108 of the localization host 110 corrects a distortion which may be inherent in the positional information of the mobile RF node 102 inputted from the positioning unit 107 with reference to the context information stored in the context storing unit, the advance information stored in the profile storing unit 109c, and the commonsense information stored in the commonsense storing unit 109d.

The case where the inference unit 108 corrects the distortion inherent in the positional information of the mobile RF node 102 inputted from the positioning unit 107 is exemplified as shown in the following Tables 2 and 3.

TABLE 2

| Case 1 | |
| --- | --- |
| 1. | Profile of a user A: (age = 65, sex = female, health condition = arthritis, residence = 110 Ho |
| 2. | Context<br>11:50 pm: A's position = a halfway point of the hallway between 110 Ho and 111 Ho<br>00:40 am: (no positional change) |
| 3. | Commonsense<br>(1) An elderly person does not stay longer than 30 minutes in a hallway in front of the residence after midnight.<br>The elderly person goes to sleep after 00:00 am.<br>The elderly person sleeps into a bedroom of his residence.<br>Men and women above the age of 60 are elderly people. |
| 4. | Processing of inference unit<br>A is an elderly person.<br>Currently, A is asleep.<br>A sleeps in a bedroom of 110 Ho.<br>Currently, A is in the hallway. Conflict with commonsense<br>(result of inference) corrected to "A's position = bedroom of 110 Ho" between 11:50 pm~00:40 am |

TABLE 3

| Case 2 | |
| --- | --- |
| 1. | Profile of a user A: (age = 65, sex = female, health condition = arthritis, residence = 110 Ho |
| 2. | Context<br>11:50:15: A's position = living room of 110 Ho<br>11:50:17: A's position = bathroom of 110 Ho<br>11:50:18: A's position = living room of 110 Ho<br>(case where the position is rapidly changed by a rapid change in radio wave environment) |
| 3. | Commonsense<br>Men and women above the age of 60 are elderly people.<br>(2) A movement velocity of an elderly person with arthritis is 2m/s or less. |
| 4. | Processing of inference unit<br>A is an elderly person.<br>Because A's movement distance is 10 m at between 11:50:1~11:50:18, a movement velocity corresponds to 3.3 [m/s]. Conflict with commonsense<br>(result of inference) corrected to "A's position = living room of 110 Ho" at between 11:50:1~11:50:18 |

As the kinds of sensors that can be used in the space where the user is to exist are various, the more various kinds of context information can be used by the inference unit 108, thereby further enhancing the localization accuracy. In the case where the inertial sensor and the action recognizer are additionally provided, the inertial sensor and the action recognizer can additionally recognize the movement and action of the user, and as a result, acquired movement information and action information can be used in the inference unit 108. Further, as described above, in the case where the localization system according to the present invention additionally includes the action recognizer, it is preferable that the recognized action information is additionally stored in the context storing unit 109b as context information and additional limitations by the user's action as shown in the following Table 4 are stored as commonsense information in the commonsense storing unit 109d.

TABLE 4

| Category | Example |
| --- | --- |
| Physical kinematic limitation | (1) movable by walking or running<br>(2) not movable while sitting or lying |

For instance, even though "while the user is sitting" is stored in the context storing unit 109b, if movement of the position of the mobile RF node 102 (position of the user having the corresponding mobile RF node) calculated by the positioning unit 107 is indicated, the inference unit 108 determines that the movement of the position of the mobile RF node 102 is a positioning error due to the distortion of RF radio wave and corrects the position (or movement, or action) of the mobile RF node.

As described above, in the case where the localization system according to the present invention includes at least one of the camera sensor 105 and the mobile robot 106, the recognition information of the user recognized by the camera sensor 105 and the recognition information of the user recognized by the mobile robot 106 are calculated in the positioning unit 107 and used to correct the distortion inherent in the outputted positional information of the mobile RF node 102 in more detail.

In the localization system according to the present invention, in the case where, a wireless network is constituted by minimizing the number of the fixed RF nodes 101, the positioning error of the positioning unit 107 further increases, but as described above, if the recognition devices such as the camera sensor 105 and the mobile robot 106 are provided, the user's position is more precisely obtained on the basis of the position of the camera sensor 105B or the position of the mobile robot 106, such that the positioning result of the positioning unit 107 can be corrected and it is useful for actually verifying the user's position obtained by the positioning unit 107.

In addition, as described above, in the case where the localization system according to the present invention additionally includes at least one of the camera sensor 105 and the mobile robot 106, it is preferable that additional limitations as shown in the following Table 5 are stored as commonsense information in the commonsense storing unit 109d.

TABLE 5

| Category | Example |
| --- | --- |
| Commonsense | (1) When a robot recognizes a user U at a location L and confidence degree for recognition is 90 or more, the user U is at the |

TABLE 5-continued

| Category | Example |
| --- | --- |
| | location L.<br>(2) When a camera installed at a location L recognizes a user U and confidence degree for recognition is 90 or more, the user U is at the location L. |

Since the limitations of Table 5 have priority over the positioning unit 107, the inference unit 108 performs a procedure replacing the result of the positioning unit 107 with the positioning result by the limitations as shown in Table 5.

Figure 2:
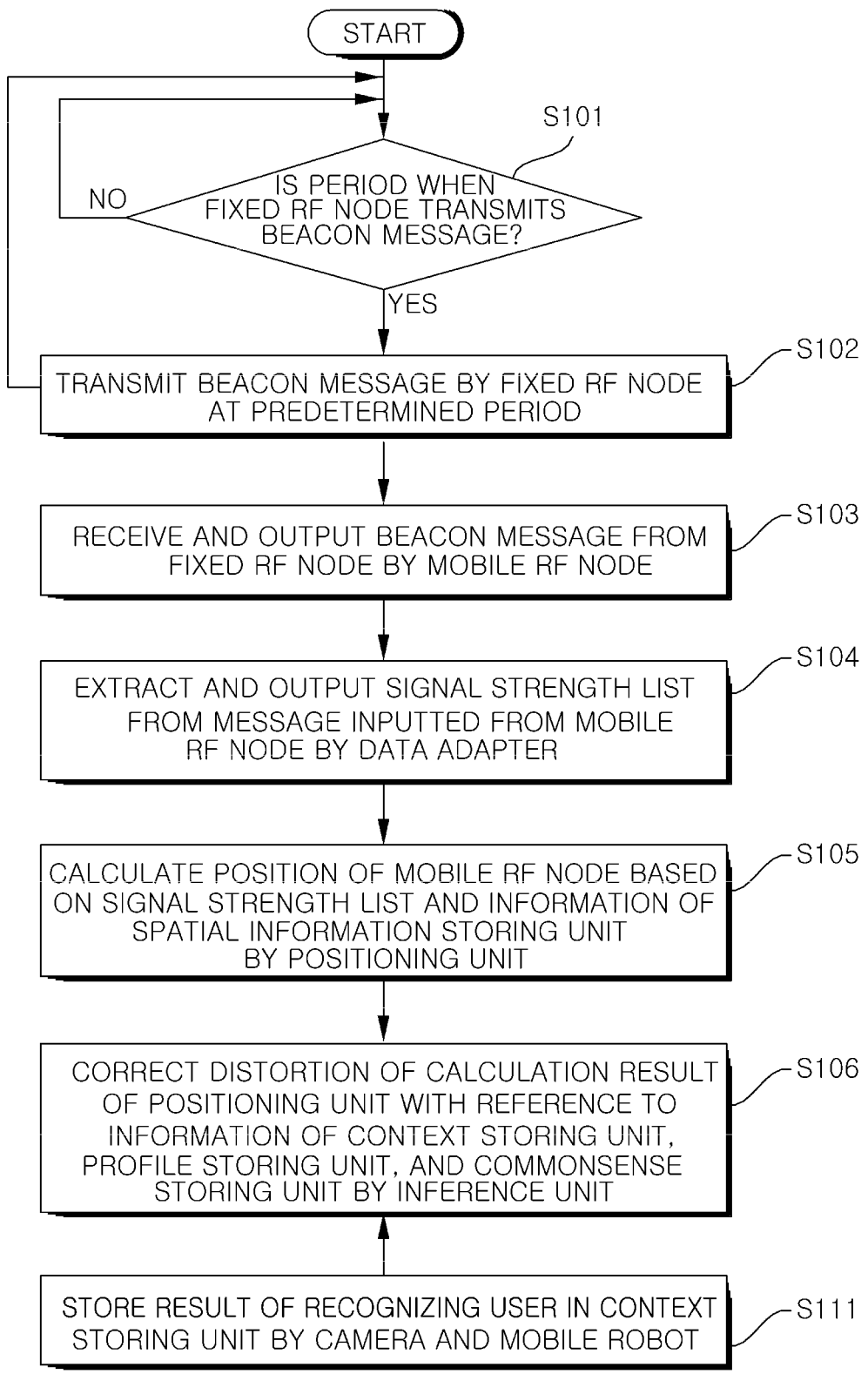
FIG. 2 is a flowchart showing a localization method according to an exemplary embodiment of the present invention.

Hereinafter, a localization method according to an exemplary embodiment of the present invention is described with reference to FIG. 2. In describing the localization method according to the exemplary embodiment of the present invention, the same description as the localization system according to the exemplary embodiment of the present invention as described above is omitted.

First, a fixed RF node 101 transmits a beacon message at a predetermined period and a mobile RF node 102 moving with a user receives and outputs the beacon message (S101 to S103).

The mobile RF node 102 may be directly carried by a user needed to be localized or embedded in a device worn by the user needed to be localized and receives and outputs the beacon message transmitted from the fixed RF node 101.

Next, the data adapter 104 extracts and outputs a signal strength list from the message inputted from the mobile RF node 102 (S104).

Next, the positioning unit 107 calculates the position of the mobile RF node 102 on the basis of the signal strength list inputted from the data adapter 104 and the positional information of the fixed RF node 101 and outputs the positional information of the mobile RF node 102 (S105).

While the steps (S101 to S105) are performed, the recognition devices 105 and 106 output the recognition result of recognizing the user while moving or being fixed and the context storing unit 109d stores the recognition result inputted from the recognition devices 105 and 106 as the context information of the user's position (S111).

In this case, the recognition devices 105 and 106 output recognition results of recognizing the user while moving or being fixed and as specific examples, there are a camera sensor 105 and a mobile robot 106.

The camera sensor 105 is fixed in the space where the user is to exist and recognizes the user (person or object) within its own sensing range in a possible situation. The recognized result is stored in the context storing unit 109b. The recognition result recognized by the camera sensor 105 includes information on who the recognized user is, information on a position where the user is recognized (i.e., information on the position where the camera sensor 105 is installed, on an angle at which the camera sensor 105 views the user, or the like) and information on the time when the user is recognized.

While freely moving in a space in accordance with a given role, the mobile robot 106 recognizes a user (person or object) whom the mobile robot 106 runs into in a possible situation or recognizes the user when the user uses the mobile robot 106. The recognition result is stored in the context storing unit 109b. The recognition result recognized by the mobile robot 106 includes information on who the recognized user is, information on a position where the user is recognized, and information on the time when the user is recognized.

Thereafter, the inference unit 108 corrects the distortion of the positional information of the mobile RF node 102 inputted from the positioning unit 107 with reference to the context information stored in the context storing unit 109b. In this case, in correcting the distortion of the positional information of the mobile RF node 102 inputted from the positioning unit 107, the inference unit 208 corrects the distortion with reference to advance information stored in the profile storing unit 109c and commonsense information stored in the commonsense storing unit 109d as well as the context information stored in the context storing unit 109b (S106).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A localization device receiving a beacon message inputted from a fixed RF node to output the message, receiving the message from a mobile RF node moving with a user, and receiving a recognition result from a recognition device recognizing the user while moving or being fixed, comprising:
    a positioning unit calculating a position of the mobile RF node on the basis of the message inputted from the mobile RF node and positional information of the fixed RF node to output positional information of the mobile RF node;
    a context storing unit storing the recognition result inputted from the recognition device as context information of a position of a user; and
    an inference unit correcting a distortion of the positional information of the mobile RF node inputted from the positioning unit with reference to the context information stored in the context storing unit.

2. The localization device of claim 1, wherein the context storing unit receives and stores movement information of the user recognized by an inertial sensor and action information of the user recognized by an action recognizer and the inertial sensor recognizes movement of the user while moving with the user and the action recognizer recognizes an action of the user while moving with the user.

3. The localization device of claim 1, wherein the recognition device includes at least one of a camera sensor and a mobile robot, and the camera sensor recognizes the user within a sensing range while being fixed, and the mobile robot recognizes a user whom the mobile robot runs into while moving or recognizes the user when the user uses the mobile robot.

4. The localization device of claim 1, wherein the positioning unit calculates a position of the mobile RF node on the basis of a signal strength list extracted from the message outputted from the mobile RF node and the positional information of the fixed RF node to output positional information of the mobile RF node.

5. The localization device of claim 1, wherein the recognition result inputted to the context storing unit from the recognition device includes information on an identity of the recognized user is, information on a position where the user is recognized and information on the time when the user is recognized.

6. The localization device of claim 1, wherein the context storing unit stores the recognition result inputted from the recognition device as context information indicating the position of the user with time.

7. The localization device of claim 1, further comprising:
    at least one of a profile storing unit storing advance information for the user and a commonsense storing unit storing commonsense information regarding the user and an environment where the user exists, wherein when the inference unit corrects the distortion of the positional information of the mobile RF node inputted from the positioning unit with reference to the context information stored in the context storing unit, the inference unit corrects the distortion with reference to additionally at least one of the advance information stored in the profile storing unit and the commonsense information stored in the commonsense storing unit.

8. A localization method for localizing a user by receiving a beacon message inputted from a fixed RF node to output the message, receiving the message from a mobile RF node moving with a user, and receiving a recognition result from a recognition device recognizing the user while moving or being fixed, the method comprising:
    extracting and outputting a signal strength list from the message inputted from the mobile RF node;
    calculating a position of the mobile RF node on the basis of the signal strength list and positional information of the fixed RF node to output positional information of the mobile RF node; and
    correcting a distortion of the positional information of the mobile RF node with reference to the context information on a position of the user that is a recognition result inputted from the recognition device.

9. The method of claim 8, wherein the context information referred to in the correcting further includes movement information of the user recognized by an inertial sensor and action information of the user recognized by an action recognizer, and the inertial sensor recognizes movement of the user while moving with the user and the action recognizer recognizes an action of the user while moving with the user.

10. The method of claim 8, wherein the recognition device includes at least one of a camera sensor and a mobile robot and in the correcting, the distortion is corrected with reference to context information of the position of the user including at least one of the result of recognizing the user within a sensing range of the camera sensor which is installed to be fixed and the result of recognizing the user whom the mobile robot runs into while the mobile robot moves or recognizing the user when the user uses the mobile robot.

11. The method of claim 8, wherein the recognition result inputted from the recognition device includes information on an identity of the recognized user is, information on a position where the user is recognized and information on the time when the user is recognized.

12. The method of claim 8, wherein the context information inputted from the recognition device includes positional information of the user with time.

13. The method of claim 8, wherein in the correcting of the distortion with reference to the context information, the distortion is corrected with reference to additionally at least one of advance information stored in a profile for the user and commonsense information regarding the user and an environment where the user exists stored in the profile for the user.

* * * * *